United States Patent
Wang et al.

(10) Patent No.: US 11,403,320 B2
(45) Date of Patent: Aug. 2, 2022

(54) ELASTIC IN-MEMORY DATABASE PROVISIONING ON DATABASE-AS-A-SERVICE

(71) Applicant: SAP SE, Walldorf (DE)

(72) Inventors: Yu Wang, Xi'an (CN); Long Du, Xi'an (CN); Le Zhang, Xi'an (CN); Xiaodan Yuan, Xi'An (CN)

(73) Assignee: SAP SE, Walldorf (DE)

( * ) Notice: Subject to any disclaimer, the term of this patent is extended or adjusted under 35 U.S.C. 154(b) by 700 days.

(21) Appl. No.: 16/294,570

(22) Filed: Mar. 6, 2019

(65) Prior Publication Data

US 2020/0285652 A1    Sep. 10, 2020

(51) Int. Cl.
| | |
|---|---|
| G06F 16/25 | (2019.01) |
| G06F 16/27 | (2019.01) |
| H04L 67/60 | (2022.01) |
| H04L 9/40 | (2022.01) |
| H04L 61/5007 | (2022.01) |

(52) U.S. Cl.
CPC .......... *G06F 16/27* (2019.01); *G06F 16/252* (2019.01); *H04L 61/2007* (2013.01); *H04L 63/029* (2013.01); *H04L 67/32* (2013.01)

(58) Field of Classification Search
CPC ...... G06F 16/252; G06F 16/27; G06F 16/273; G06F 16/275; G06F 16/278
See application file for complete search history.

(56) References Cited

U.S. PATENT DOCUMENTS

| | | | |
|---|---|---|---|
| 6,751,794 B1 | 6/2004 | Mccaleb et al. | |
| 7,305,421 B2 | 12/2007 | Cha et al. | |
| 9,330,155 B1 | 5/2016 | Bono et al. | |
| 10,997,208 B2 | 5/2021 | Du et al. | |
| 2007/0136297 A1 | 6/2007 | Choe | |
| 2008/0104132 A1 | 5/2008 | Toner | |
| 2013/0276070 A1* | 10/2013 | Lee | H04L 63/083 726/4 |
| 2014/0359463 A1 | 12/2014 | Schaus | |
| 2016/0072895 A1* | 3/2016 | Bailey | H04L 67/1002 709/228 |
| 2017/0116043 A1* | 4/2017 | Muthulingam | G06F 9/5083 |

(Continued)

OTHER PUBLICATIONS

"GitHub—docker/distribution: The Docker toolset to pack, ship, store, and deliver content", [Online]. Retrieved from the Internet: <URL: https://github.com/docker/distribution>, (Accessed Jan. 27, 2019), 4 pgs.

(Continued)

*Primary Examiner* — Vaishali Shah
(74) *Attorney, Agent, or Firm* — Schwegman Lundberg & Woessner, P.A.

(57) ABSTRACT

In an example embodiment, a solution is used to provide for multiple and concurrent web application accessing of a database in a database-as-a-service (DBaaS) framework. More particularly, a cloud solution is provided on a DBaaS for leveraging Docker network functionality to provide a virtual Internet Protocol (IP) address pool, while utilizing in-memory database technology to set up an entire accessing solution for multiple and concurrent DBaaS users and web applications, which serve the data-intensive jobs to the in-memory database. This allows for improved functionality, performance, concurrency, and handling of network stress.

20 Claims, 8 Drawing Sheets

(56) References Cited

U.S. PATENT DOCUMENTS

| | | | |
|---|---|---|---|
| 2017/0219357 A1 | 8/2017 | Pfeifle | |
| 2017/0244593 A1 | 8/2017 | Rangasamy et al. | |
| 2018/0143856 A1 | 5/2018 | Du et al. | |
| 2018/0146067 A1 | 5/2018 | Du et al. | |
| 2018/0146069 A1 | 5/2018 | Du et al. | |
| 2018/0205652 A1* | 7/2018 | Saxena | H04L 61/2557 |
| 2018/0278725 A1* | 9/2018 | Thayer | H04L 69/22 |
| 2019/0156047 A1 | 5/2019 | Daniel et al. | |
| 2019/0163469 A1 | 5/2019 | Sreenivasa et al. | |
| 2019/0294722 A1 | 9/2019 | Mohan | |
| 2020/0241864 A1* | 7/2020 | Duvur | G06F 9/455 |
| 2020/0257704 A1 | 8/2020 | Du et al. | |
| 2020/0028561 A1 | 9/2020 | Wang et al. | |
| 2021/0084537 A1* | 3/2021 | Zhang | H04L 61/6022 |
| 2021/0216570 A1 | 7/2021 | Du et al. | |

OTHER PUBLICATIONS

"Google Container Registry—Secure, Private Docker Registry", [Online]. Retrieved from the Internet: <URL: https://cloud.google.com/container-registry/>, (Accessed Jan. 27, 2019), 7 pgs.

"Google URL Shortener", [Online]. Retrieved from the Internet: <URL: goo.gl/>, (Accessed Jan. 27, 2019), 2 pgs.

"IBM Cloud Docs", [Online], Retrieved from the Internet: <URL: //console.bluemix.net/docs/>, (Accessed Jan. 27, 2019), 4 pgs.

"Oracle Database Provisioning", Enterprise Manager Lifecycles Management Administrator's Guide, [Online], Retrieved from the Internet: <URL: https://docs.oracle.com/cd/E24628_01/em.121/e27046/prov_db_overview.htm#EMLCM11094> , (2019), 30 pgs.

"Peer-to-peer", Wikipedia, http://en.wikipedia.org/wiki/Peer_to_peer, (Aug, 1, 2006), 7 pages.

Anwar, Ali, et al., "Improving Docker Registry Design based on Production Workload Analysis", 16th USENIX Conference on File and Storage Technologies, [Online]. Retrieved from the Internet: <URL: https://www.usenix.org/system/files/conference/fast18/fast18-anwar.pdf>, (2018), 265-278.

Bligh, Alex, "Distributed Storage: Heads in the Cloud", Flexiant IP Ltd., [Online]. Retrieved from the Internet: <URL: https://www.flexiant.com/2013/07/26/what-is-distributed-storage-and-why-use-it-part-2/>, (Jul. 26, 2013), 5 pgs.

Ekici, Erhan, "Microservices Architecture, Containers and Docker.", IBM—Software Defined Environments Technical Blog, [Online]. Retrieved from the Internet: <URL:https://www.ibm.com/developerworks/community/blogs/1ba56fe3-efad-432f-a1ab-58ba39 . . . >, (Dec. 8, 2014), 4 pgs.

Schneider, Eric, "Multitenancy", [Online]. Retrieved from the Internet: <URL: https://archive.sap.com/documents/docs/DOC-59771>, (2015), 3 pgs.

Venumbaka, Saiprashanth, "SAP HANA Multitenant Database Containers", [Online], Retrieved from the Internet: <URL: https://blogs.saphana.com/2015/01/27/sap-hana-multitenant-database-containers/>, (2015), 3 pgs.

"U.S. Appl. No. 16/274,742, Notice of Allowance dated Jan. 22, 2021", 9 pgs.

"U.S. Appl. No. 16/294,658, Examiner Interview Summary dated Jan. 13, 2022", 2 pgs.

"U.S. Appl. No. 16/294,658, Non Final Office Action dated Dec. 17, 2021", 18 pgs.

"U.S. Appl. No. 16/294,658, Response filed Jan. 13, 2022 to Non Final Office Action dated Dec. 17, 2021", 10 pgs.

Cecchet, Emmanuel, et al., "Dolly: Virtualization-driven Database Provisioning for the Cloud", International Conference on Virtual Execution Environments, (2011), 51-62.

"U.S. Appl. No. 16/294,658, Final Office Action dated Feb. 24, 2022", 21 pgs.

"U.S. Appl. No. 16/294,658, Response filed Mar. 16, 2022 to Final Office Action dated Feb. 24, 2022", 13 pgs.

"U.S. Appl. No. 16/294,658, Examiner Interview Summary dated Mar. 18, 2022", 2 pgs.

* cited by examiner

ELASTIC IN-MEMORY DATABASE PROVISIONING ON DATABASE-AS-A-SERVICE

TECHNICAL FIELD

This document generally relates to systems and methods for in-memory databases. More specifically, this document relates to elastic in-memory database provisioning on database-as-a-service.

BACKGROUND

An in-memory database is a database management system that primarily relies on main memory of a computer system for storage. It is contrasted with database management systems that employ a disk-storage mechanism.

Containerization of software applications has become a more popular mechanism for distributing software applications in recent years. Containerization is an operating system-level virtualization method that allows distributed applications to be deployed and run without launching an entire virtual machine for each application. Multiple isolated applications or services run on a single host and access the same operating system kernel.

Application containers include runtime components, such as files, environment variables, and libraries, needed to run the desired software applications. Application containers consume fewer resources than comparable deployments on virtual machines because containers are able to share resources without a full operating system to underpin each application. The complete set of information to execute in a container is called the image. The container engine deploys these images on hosts.

One technical issue that arises with deployments of containerized software applications, such as containerized microservices, in a datacenter is ensuring that multiple and concurrent web applications can access a database simultaneously.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a solution is used to provide for multiple and concurrent web application accessing of a database in a database-as-a-service (DBaaS) framework. More particularly, a cloud solution is provided on a DBaaS for leveraging Docker network functionality to provide a virtual Internet Protocol (IP) address pool, while utilizing in-memory database technology to set up an entire accessing solution for multiple and concurrent DBaaS users and web applications, which serve the data-intensive jobs to the in-memory database. This allows for improved functionality, performance, concurrency, and handling of network stress.

Figure 1:
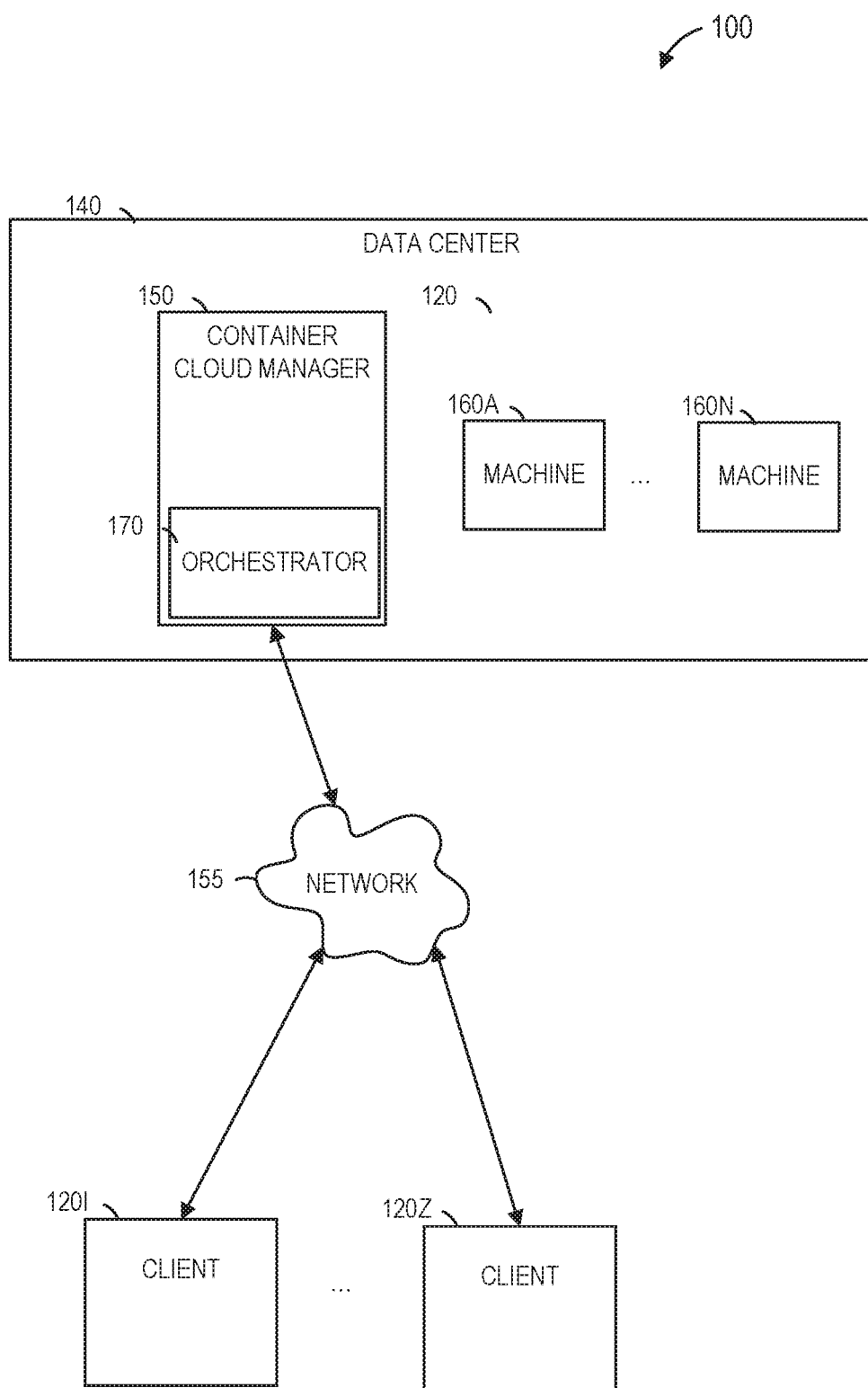
FIG. 1 is a block diagram illustrating an exemplary architecture, in accordance with an example embodiment.

FIG. 1 is a block diagram illustrating an exemplary architecture 100, in accordance with an example embodiment. Architecture 100 may have a distributed architecture. In one example implementation, the environment includes a data center 140. The data center 140 provides various services to users. The data center 140 and services form a cloud platform. The cloud platform, for example, may be Cloud Foundry. Other types of cloud platforms may also be useful.

The data center 140 includes numerous interconnected servers. For example, the servers are connected through a communication network 155. The communication network 155 may be an internet, an intranet, a local area network (LAN), a wide area network (WAN) or a combination thereof. Other types of connections may also be useful.

A plurality of clients, such as client 120I to client 120z, may access the data center 140 through a communication network 155. The value z represents the number of clients 120. The communication network 155 may be an internet or a WiFi communication network. Other types of communication networks 155, such as an intranet or a combination of different types of communication networks 155 may also be useful. Other techniques for communicating with the data center 140 by the clients 120 may also be useful. Access to the data center 140 may require a user account and password. Other types of security measures may also be implemented.

A client 120 may be a local or remote computing device with, for example, a local memory and a processor. The memory may include fixed and/or removable non-transitory computer-readable media, such as a magnetic computer disk, CD-ROM, or other suitable media. Various types of processing devices may serve as a client 120. For example, the client 120 may be a PC, a tablet PC, a workstation, a network computer, a kiosk or a mobile computing device, such as a laptop, a tablet or a smart phone. Other types of processing devices may also be used. The client 120 can receive, transmit, process and store any appropriate data associated with the architecture 100.

Clients 120I-120Z may access the data center 140 for various reasons. In one embodiment, clients 120 may include developer clients and user clients. For example, developer clients develop applications (Apps) for the data center 140. In one example embodiment, the developer clients may be developing apps for a cloud platform or cloud foundry. As for user clients, they access the data center 140 to utilize various available apps. Other types of clients 120 may also be included. For example, a front-end portion of an app, which is selected for installation, is loaded onto the client device. When invoked by the user, the back-end portion of the app runs in the data center 140, based on instructions by the user client. The results are presented to the user on the user device.

As for the data center 140, a server may be a computer which includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. A server, for example, is a host in the data center 140 and does not include a display device. Other types and configurations of servers may also be useful.

As shown, the data center 140 includes a container cloud manager 150. The container cloud manager 150 manages the resources of the data center 140, which includes a plurality of machines, such as machine 160A to machine 160N. The value N represents the number of machines 160 in a data center 140. It is understood that in a data center 140, N may be a very large number. For example, N may be about in the magnitude of thousands or even more. The number N may depend on, for example, the size of the data center 140. Other values of N may also be useful. The value of n may be dynamic. For example, N machines 160 may be expanded or contracted based on requirements. The container cloud manager 150 and machines 160a-160n, for example, are servers. The container cloud manager 150 serves the role of a manager while machines 160 serve the role of workers. Other configurations of container cloud manager 150 and machines 160A-160N may also be useful.

The various components of the data center 140, such as the container cloud manager 150 and machines 160A-160N, as discussed, are interconnected. The components may be distributed over different locations. For example, the components may be distributed across different buildings. The different buildings may be proximately distributed, for example, in a city. A building may be provided with its own back-up power source. Providing a back-up power source ensures undisturbed operation of the data center 140 during a power outage. As for components of the data center 140, they may be distributed into different racks in a building. Power outage to one rack or detects of a rack will not affect the operation of all other racks.

In one example embodiment, the container cloud manager 150 includes a storage master and a master database. In one embodiment, the master database may be an in-memory database. For example, the master database may include an in-memory database XE Engine. Other types of databases may also be useful. In one embodiment, the container cloud manager 150 includes multiple copies or replications. For example, the container cloud manager 150 includes an original (master), second and third replications. Providing other numbers of copies may also be useful. In one embodiment, the cloud manager involves in-memory database System Replication (SR). The container cloud manager 150 and replications will be subsequently discussed in greater detail.

In one example embodiment, the container cloud manager 150 is embedded with an application level container framework. For example, the container cloud manager 150 and its replications work as a container framework. In one example embodiment, the container framework is a Docker™ framework. For example, the container cloud manager 150 and its replications work as a Docker™ framework. Other types of container frameworks may also be useful. For example, container frameworks, such as LXC or Rocket™ container frameworks may also be useful. Docker™, for example, is embedded with the master database. This enables management of containers and cloud application (app) images of the data center 140. As will be subsequently discussed, apps are stored as app images in the data center 140 and the app images are run in the containers. The container cloud manager 150, in one example embodiment, employs a container service, such as a Docker™ service, to manage containers and app images of the data center 140. Other types of container services may also be useful. In one embodiment, Docker™ is embedded within in-memory master database, enabling management of containers and app images of the data center 140.

The framework, including container cloud manager 150, containers and app images, serves as a cloud platform. For example, the cloud platform offers container service to customers. The container service in the cloud platform may be referred to as a container cloud. The container cloud may be a cloud foundry. As for the machines 160, they are hosts which serve as the resources for the data center 140. The container cloud manager 150 manages the resources of the data center 140. For example, the machines 160 are employed to build, package and deploy cloud Apps.

The container framework, such as Docker™ framework, may be a tool, an infrastructure, or an architecture 100 used to build, deploy and run apps using containers. In one example embodiment, the container cloud manager 150 embedded with the container framework supports a "one-build, run-everywhere" concept or function. In "one-build, run-everywhere", a customized app needs only to be built once. For example, a new app is built if it does not already exist in the data center 140. This is the one-build part of the "one-build, run-everywhere" function. Once the new app is built, its app image is stored in the data center 140. Subsequently, when a user searches for the app, the user can find the app image and do whatever the user desires. In other words, the app can run everywhere. For example, this is the run-everywhere part of the "one-build, run-everywhere" function.

In one embodiment, the one-build function is supported by a build tool. In one embodiment, the build tool is a Jenkins build tool. Other types of build tools may also be useful. The build tool, for example, is a stand-alone tool. The build tool may run on any data center servers. A build is performed when a new app is released. For example, when a new app is delivered, it triggers the build tool to perform a new build using Docker™. In one embodiment, the storage master searches the master database to see if the app already exists in the data center 140. If it does not, it triggers the build tool to initiate a build. For example, the container build is in the Jenkins build process. The container cloud manager 150 maintains information of machines 160 in the data center 140. For example, machines 160 which support Docker™ are maintained in the master database. The container cloud manager 150 selects a machine 160A-160N that supports Docker™ to build the app. The storage master and master database work together as the Docker™ framework. For example, the storage master and in-memory database SR of the container cloud manager 150 works as the Docker™ framework.

The build includes generating an image of the app. A container is also built as part of the build process. The container, for example, is the runtime of the app image. The app image includes container configurations. For example, the container is configured with necessary dependencies and functions, and packed back to the app image. In one example embodiment, the app image includes configurations for a Docker™ container. The framework may also support other types of containers. For example, an app image may include configurations for other types of containers, such as LXC or Rocket™. The container runs when the app is started. For example, the container starts based on the app image. The container isolates the app from the host and ensures that the app will run on any machines 160 of the data center 140, regardless of any customized settings.

After the build is completed, information of the app image is registered with the master database of the container cloud manager 150. In one example embodiment, information of the x copies of the app image is registered in the master database, such as an in-memory master database. In one example embodiment, 3 copies of the app image are stored in the data center 140 (e.g., x=3). Other values of x may also be useful. Excess copies greater than x are deleted from the data center 140. Each copy of the app image is stored in a different host of the data center 140. Such information may include app image information, including name, version, and host location where the images are stored. The app image is stored in the data center 140. Once the app exists in the data center 140, no additional build is performed. As such, only one build is needed for the app.

In an example embodiment, when a new app is released, a new container is created. For example, a new app release involves creating a new app image and a new container. The container is configured and packed back to the app image. Intermediate container or containers are deleted, leaving the app image. The container cloud manager 150 encapsulates a container service, such as Docker™ service. Other types of container services may also be useful. For example, the Docker™ command interface is encapsulated as a library for further development. Encapsulating or embedding the Docker™ service enables transparent operation by the user, such as using a Linux command line directly. Also, Docker™ service supports some container changes or modifications. Such changes include, for example, specifying which host runs the app, Secure Shell (SSH) configuration and batch operation on Docker™. Other types of changes or modifications may also be useful. Encapsulation of Docker™ services is achieved using library interfaces. The library interfaces can be used in various conditions. This enables further development. For example, a user, such as a developer, can use the library to build additional images or containers. Other types of users may also utilize the library interfaces. The user can employ the library interfaces as part of App development, App testing and App release as well as other purposes.

In one example embodiment, the container cloud manager 150 includes an orchestrator 170. The orchestrator 170 may include a flexible job scheduler and an operator pool.

The flexible job scheduler and container cloud manager 150 form a flexible job management platform for managing jobs of the data center 140. In one embodiment, flexible job management platform is based on an embedded in-memory database container service, such as a Docker™ service. The flexible job management framework can isolate various types of jobs as well as mix various jobs for efficient usage of hosts or resources in the data center 140, including build jobs.

The container framework, such as a Docker™ framework, which includes Chronos or Borg, is well designed for container based job management. For example, the job scheduler can integrate the container framework to efficiently manage the container cloud. The container based job management supports fault tolerance, job pre-emption or other job management functions. In one example embodiment, a container cloud manager 150 includes a flexible job scheduler. The flexible job scheduler leverages the data center 140's resources, including networking, memory, CPU usage for hosts load balanced by utilizing hybrid job scheduling.

In addition, the flexible job scheduler enables monitoring and analysis of jobs utilizing a container service, such as a Docker™ service. Since the container isolates the internal status of the job from the host status, the scheduler, which is on a remote host from that running the job, needs to establish an SSH tunnel from the host of the container cloud manager 150 in order to receive status update of the job. However, by utilizing the Docker™ container command from the library of commands, the scheduler, which is on a remote host from that running the job, can access the host to obtain the job status. As such, the job management framework provides efficient utilization of data center resources.

As discussed, the job scheduler performs job management functions. As discussed, jobs run in containers and numerous jobs can be actively run at one time in the data center 140. In addition, there may be different types of jobs having different priorities. The job scheduler manages the requested jobs on the container cloud. The job management functions include scheduling, monitoring, and pre-emption of jobs. For example, the job scheduler schedules jobs as requested. The schedule is made based on priority and types of jobs. As for monitoring, the job scheduler monitors job status, such as pending, started, running, finished, failed, killed or lost. In addition, the job scheduler monitors resources of the data center 140, such as resource usage status, memory usage, disk usage and CPU usage of all the hosts of the data center 140. The job scheduler may perform job pre-emption by evicting or shifting lower priority jobs and replacing them with higher priority jobs. In other words, job pre-emption relates to reorganizing the job schedule based on priority when new and higher priority jobs are requested.

The job scheduler may perform other job management functions. Other job management functions include rescheduling or re-running jobs when a job incurs a failure or is intentionally killed, managing clusters of hosts which are designated for specific jobs, as well as managing jobs which run on multiple hosts. For example, some hosts may be clustered into a pool for a specific or exclusive type of job. The data center 140 may include one or more clusters, each for a specific type of job. For a job which runs on multiple hosts, the job scheduler organizes and schedules the job on a group of hosts.

As discussed, the data center 140 receives various types or categories of job requests. The categories of job requests include batch jobs, test jobs, immediate jobs and online jobs. Batch jobs refer to large jobs which are not required within a short time. For example, batch jobs may include analysis of enterprise sales data. Test jobs relate to testing various types of tests, such as unit testing, functional testing, and performance testing by developer users. Online jobs include interactive operations. Such jobs are required to be performed almost instantaneously. As for immediate jobs, they are required to be performed within a very short time. Such jobs may include a fast function check or a component function verification. For example, such jobs should be performed within tens of seconds.

As for the operator pool, it contains optional components of the database for various support services. For example, the operator pool contains optional components of in-memory databases as services. In the case of in-memory databases, such components may include, for example, geographical information system (GIS), predictive analysis library (PAL), application function library (AFL), dynamic tiering (DT), in-memory database system replication (SR), text mining, R language integration, in-memory database cockpit, in-memory database python support, in-memory database test pack support and in-memory database mock test support. Providing other components may also be useful. For example, an in-memory database may include many more optional components. In addition, non-in-memory database components may also be useful for other types of databases.

In one example embodiment, the data center 140 maintains all base core images of a database. In one example embodiment, the data center 140 maintains all base core images of an in-memory database. Maintaining core images of other databases may also be useful. A user may select the desired version of the database and select microservices for customization. For example, a user may select the operators from the operator pool for customizing the database. In one example embodiment, a user may customize a selected version of the in-memory database with desired microservices selected from the operator pool.

In an example embodiment, when multiple and concurrent web application client requests arrive, an application program interface (API) machine gateway service may invoke an IP virtual-pool manager to provide the support of IP to each client 120. The IP virtual-pool manager can internally use Docker™ or similar network functionality to set up the IP network and virtual bridge related to the request. This virtual IP can be used to connect to the backend in-memory tenant database afterwards.

When the virtual IPs with the service requests transmit to the backend in-memory database cloud infrastructure, an in-memory cloud solution manager can determine the current available tenant database and assign the request and virtual IP to the specified tenant database, rather than booting a large and single in-memory database instance as was performed in the prior art. This saves a significant amount of consumption of system resources, many of which would not be needed for the specified accessing scenario.

Figure 2:
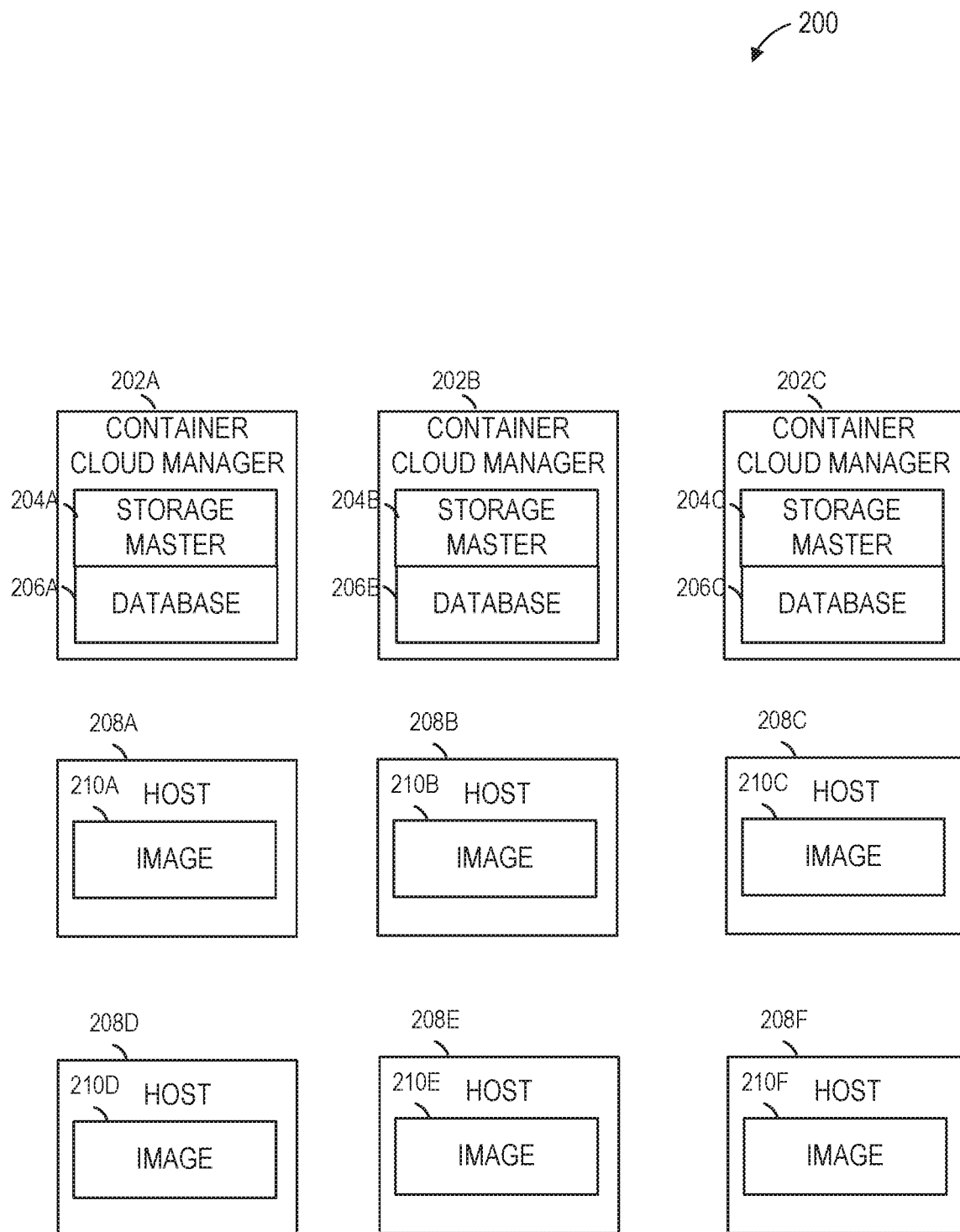
FIG. 2 shows a simplified distributed app image and container management architecture of a data center, in accordance with an example embodiment.

FIG. 2 shows a simplified distributed app image and container management architecture 200 of a data center 140, in accordance with an example embodiment. The distributed management architecture 200 includes y multiple container cloud managers 150, such as container cloud managers 202A-202C. In one embodiment, y=3. For example, the distributed management architecture 200 includes container cloud managers 202A-202C. Providing other numbers of container cloud managers 202A-202C may also be useful. In one example embodiment, the first container cloud manager 202A may be referred to as the master while the second and third container cloud managers 202B, 202C may be referred to as the second and third replications. As discussed, each container cloud manager 202A-202C includes a storage master 204A-204C and a master database 206A-206C. In one example embodiment, a container cloud manager 202A-202C also includes an orchestrator 170. The orchestrator 170 includes a job scheduler and an operator pool.

In one embodiment, the storage master 204A-204C is bundled with an in-memory database SR. For example, the storage master 204A-204C and the in-memory database work as the container cloud manager 202 to manage containers, such as Docker™ and/or other types of containers. This enables high availability due to the master and first and second replications. The master and the second replication are connected using a synchronization mode connection. For example, all information from the master is updated and maintained in the master database 206 of the second replication. The second replication and the third replication are connected using an asynchronous mode of connection. For example, information from the second replication may not be immediately updated in the master database 206 of the third replication.

As also shown, the architecture 200 includes a plurality of hosts 208A-F. Illustratively, only six hosts 208A-208F are shown for simplicity. However, it is understood that the architecture 200 may include a large number of hosts 208. Also, as already discussed, the hosts 208A-208F may be distributed and need not be located in the same location. In addition, the hosts 208A-208F may be grouped into clusters. For example, a cluster is a pool of hosts 208A-208F for exclusive usage. In other cases, all the hosts 208A-208F of the architecture 200 may be a single cluster. In other words, the architecture 200 is made of one or more pools of hosts 208A-208F, a pool of hosts 208A-208F can be one or more hosts 208 for exclusive usage. Other configurations of clusters may also be useful. For example, some pools of hosts 208A-208F are exclusively used during the day while others may be available at night.

The container cloud manager 202A-202C manages the resources of the architecture 200. In one embodiment, the first or master container cloud manger 202A may be the primary container cloud manager 202. In the event the master container cloud manager 202A is down, responsibility of data center management transfers to the second container cloud manager 202B. For example, the second container cloud manager 202B serves as a backup for the master container cloud manager 202A. The second replication effectively becomes the new master while the old master becomes the new second replication. This enables the restoration of the old master container cloud manager 202A without a service interruption.

In the event that both the first and second container cloud managers 202A, 202B are down, the third container cloud manager 202C serves as a disaster recovery system. For example, disaster recovery is performed to bring the first and second container cloud managers 202A, 202B back on-line. In one embodiment, data from the third container cloud manager 202C is used to restore the first or second container cloud manager 202A, 202B to its previous state. Once the first container cloud manager 202A is back on-line, the other cloud manager 202B may be restored. Other configurations of providing backup in the case that one of the container cloud managers 202A-202C is down may also be useful.

In one example embodiment, the storage master 204A-204C can access all hosts 208A-208F of the architecture 200. The storage master 204A-204C accesses the hosts 208A-208F by, for example, using a username and password which is maintained in the master database 206. When a new build request is initiated, the storage master 204A-204C requests host resource utilization information and selects a host 208 which can support and perform the build. For example, the master database 206 includes a list of hosts 208 which support the Docker™ build. The storage master 204A-204C selects, from the list, the host 208A-208F with the most resources available. For example, the host 208 with the biggest memory, biggest disk size and largest number of CPUs is selected. The build generates, in one embodiment, 6 copies of an app image 210A-210F. Generating other numbers of copies of an app image 210 may also be useful. As already discussed, an app image 210 includes a container packed backed to it.

Figure 3:
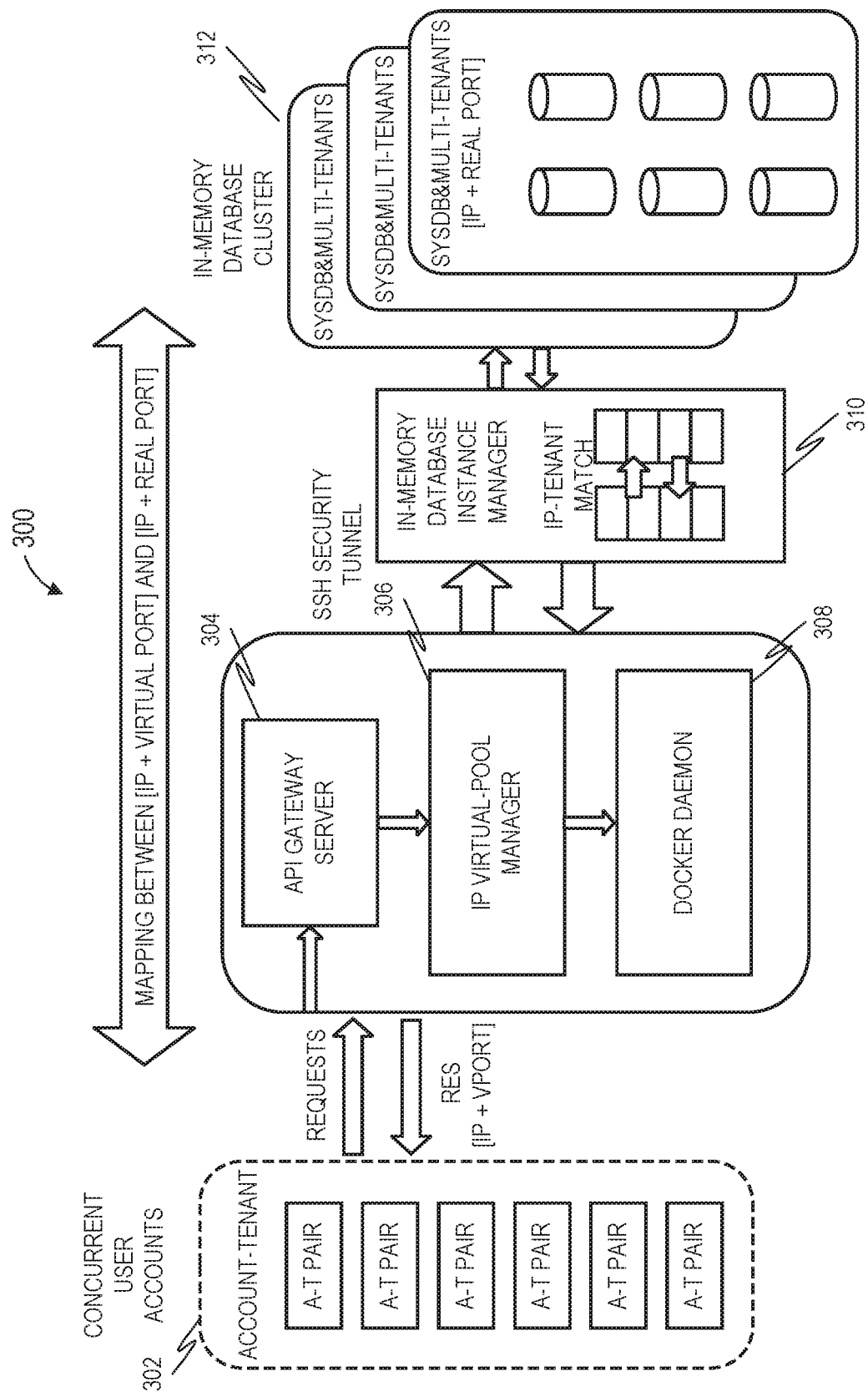
FIG. 3 is a block diagram illustrating an in-memory database virtual resource provisioning solution with security on a DBaaS architecture, in accordance with an example embodiment.

FIG. 3 is a block diagram illustrating an in-memory database virtual resource provisioning solution 300 with security on a DBaaS architecture, in accordance with an example embodiment. This figure illustrates the overall workflow and structural landscape of the design. By leveraging the Docker™ network, isolation, and the providing of resources, users 302 are able to get the virtual EP addresses from the IP virtual pool, which allows the client to communicate to as many database instances as possible. Specifically, the users 302 (or more specifically, user devices controlled by the users 302) send requests to an API Gateway server 304, which forwards these requests to an IP virtual-pool manager 306. The IP virtual-pool manager 306 uses a Docker daemon 308 as a network and IP provider and distributes virtual IP addresses from the IP virtual pool.

A secure shell (SSH) tunnel is created between the IP virtual-pool manager 306 and an in-memory database instance manager 310, which allows the in-memory database instance manager 310 to match the virtual IP addresses with corresponding tenant clusters stored in an in-memory database cluster 312. The in-memory database cluster 312 contains system database and multi-tenant database resources, so that dispatching and managing the backend database instances is provided using the above-described techniques.

All database instance information is retrieved from the IP virtual pool. In one example embodiment, unlike under traditional database instance provisioning measures, the virtual IP address and database instance resource provisioning is provided such that clients can request as many database instances as they want, depending on the lower cost and resource allocation of the backend in memory database clusters.

In an example embodiment, the quality of provisioning virtual IP pair resources to the users with high need can be guaranteed by additional memory cache architectures and solutions, which provide the capability of reading data as quickly as possible.

Figure 4:
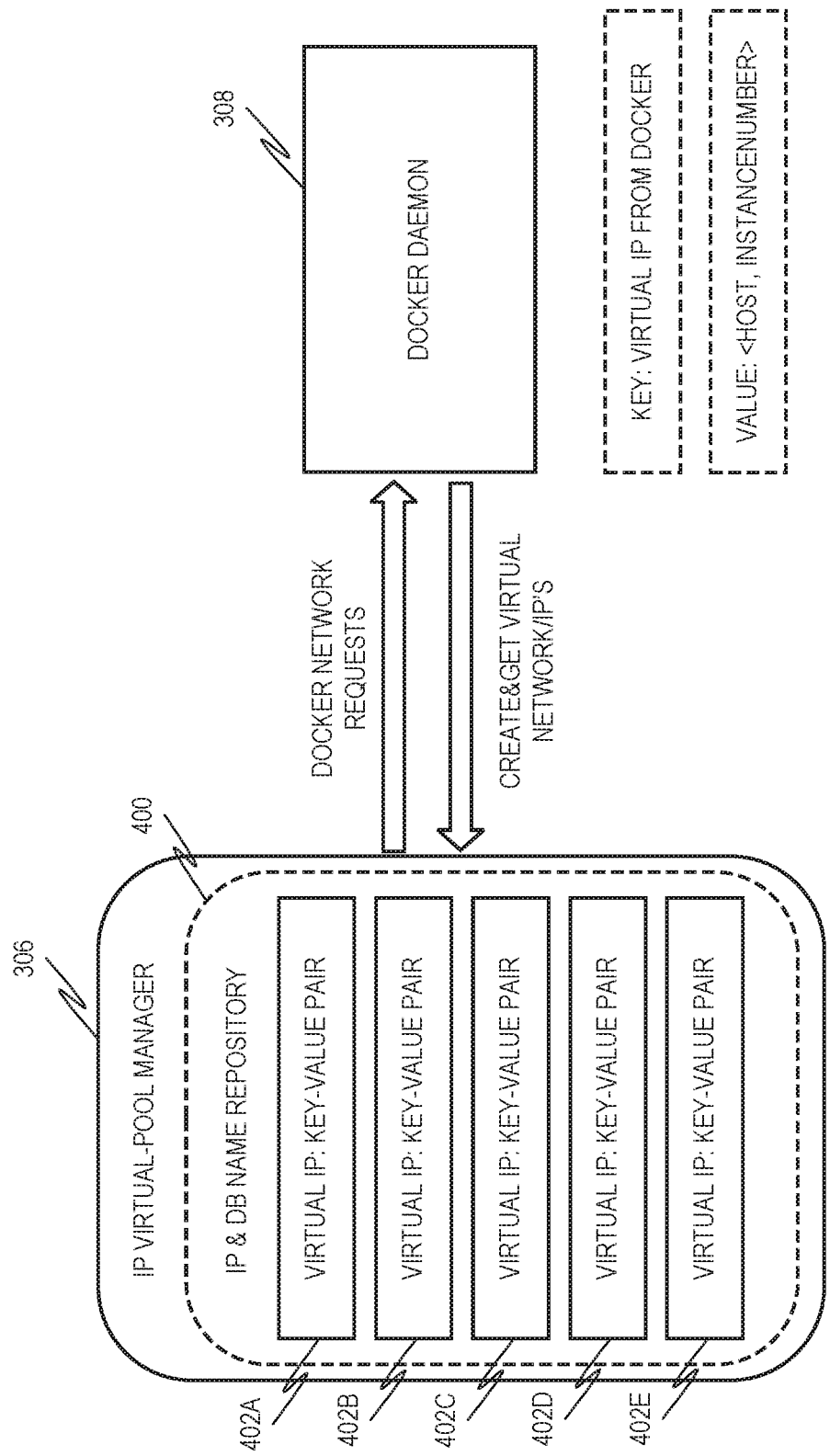
FIG. 4 is a block diagram illustrating an IP virtual-pool manager of FIG. 3 in more detail, in accordance with an example embodiment.

FIG. 4 is a block diagram illustrating the IP virtual-pool manager 306 of FIG. 3 in more detail, in accordance with an example embodiment. The IP virtual-pool manager 306 provides virtual FP address management using a Docker service and in-memory tenant database information as well. The IP virtual-pool manager 306 provides a way to make a concatenation of virtual IP addresses from Docker and the tenant database (specifically, <hostname, instance number>) as the handler pair for the direct usage of clients.

The IP virtual-pool manager 306 contains an IP and database name repository 400, which contains a number of virtual IP pairs 402A-402E, Each virtual IP pair 402A-402E contains a key and a value. The key is the virtual IP address from Docker, while the value is the concatenation of the hostname and the instance number. The IP virtual-pool manager 306 then makes Docker network requests to the Docker daemon 308, which creates the virtual network IP addresses and returns them.

In one example embodiment, with the SSH elastic tunnel functionality, the in-memory database instance manager 310 (FIG. 3) maintains a series of data structures and computing operators to dispatch the client request with the supply of information on in-memory database tenant database instances. Furthermore, once the in-memory database instance manager 310 tracks the concurrent workflow to the higher spikes, it could instantly respond to make the secure and available actions to execute the tenant database instances topology match up with the requests of the system.

In one example embodiment, group resource management can be provided to bring system state control from advanced session solutions to guarantee the commitment of user requests for the resources from the execution workflow. In one specific implementation, a high-speed hash map may be maintained to represent the dynamically changing topology of views on the in-memory database tenant database instances provided to the group users. Additionally, a related API could give users the flexibility and ability to control the resource request workflow as efficiently as possible.

Figure 5:
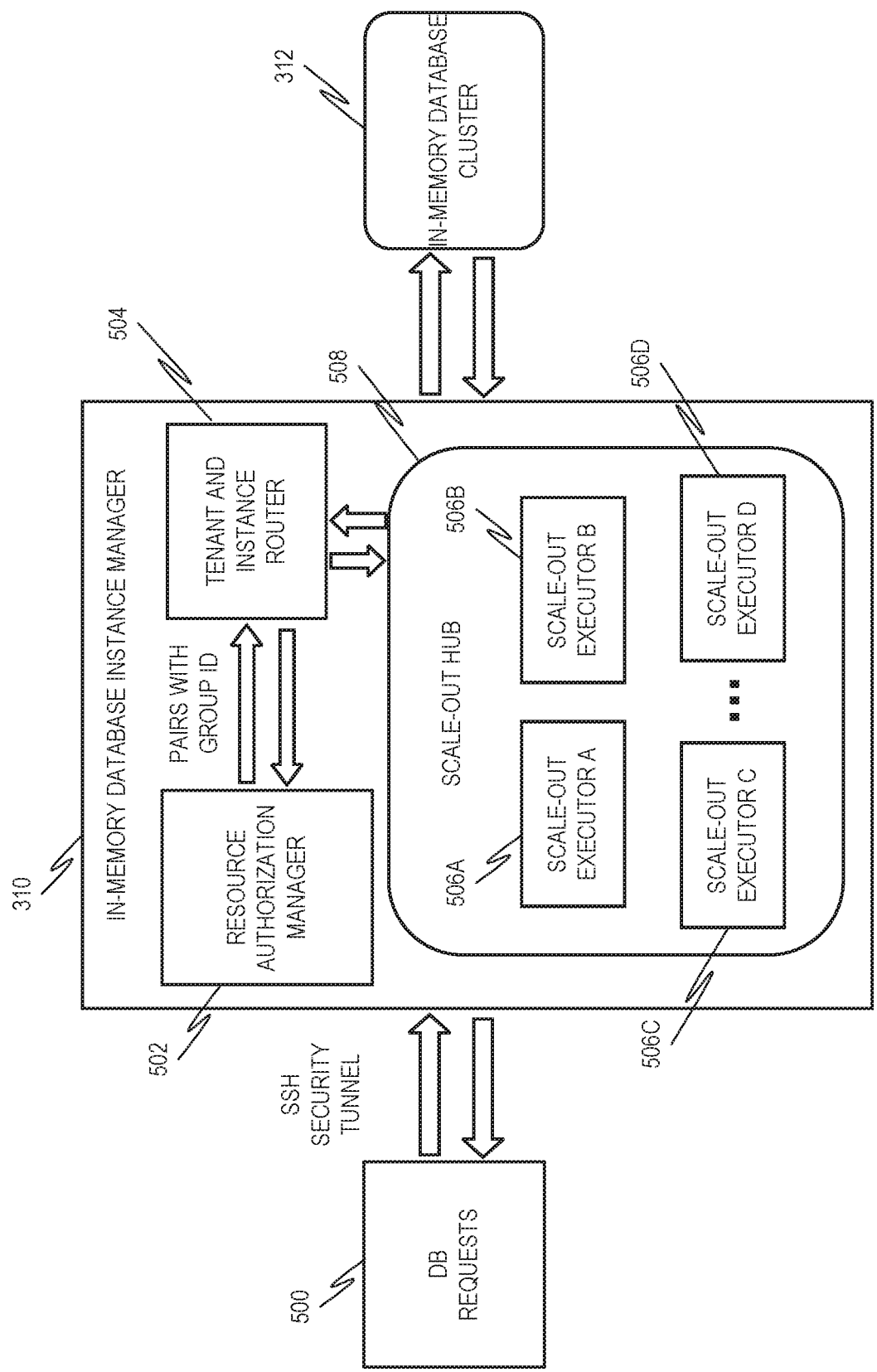
FIG. 5 is a block diagram illustrating an in-memory database instance manager of FIG. 3 in more detail, in accordance with an example embodiment.

FIG. 5 is a block diagram illustrating the in-memory database instance manager 310 of FIG. 3 in more detail, in accordance with an example embodiment. When database requests 500 arrive, a resource authorization manager 502 provides user authorization to allocate specific resources to the users. It also pairs the requests with group IDs. A tenant and instance router 504 then dispatches the requests to particular in-memory system databases that have idle tenant database instances, located in the in-memory database cluster 312.

When the instance is ready, the response will arrive back at the in-memory database instance manager 310 for further response to the client. Furthermore, the in-memory database instance manager 310 also has the ability to monitor the concurrency from the various clients, which expect to be on high concurrent status when the system is online. Additionally, the tenant and instance router 504 plays the role of a dispatcher, to dispatch specific requests to the proper executor 506A-506D. The executors 506A-506D represent the specified remote proxy executors to the in-memory database system, covering the system database and the tenant database. These may be known as scale-out executors and are located in a scale-out hub 508. The scale-out executors 506A-506D perform the work to execute queries in a dynamic context to fetch the real-time tenant instances available in the in-memory database cluster 312. Thus, the scale-out hub 508 could start up as many tenant database instances as possible based on the system workload and user resource group authorization control, with the overall status monitored at that time.

In one example embodiment, the scale-out hub 508 plays the role of a central dispatcher of certain queries to the remote in-memory database system database in the in-memory database cluster 312, to fetch some dynamic information from the specific instances. This can be implemented with a multi-thread execution context. Additionally, if the system demands highly concurrent execution capabilities, it could be implemented as a service with multi-process solutions as well.

Figure 6:
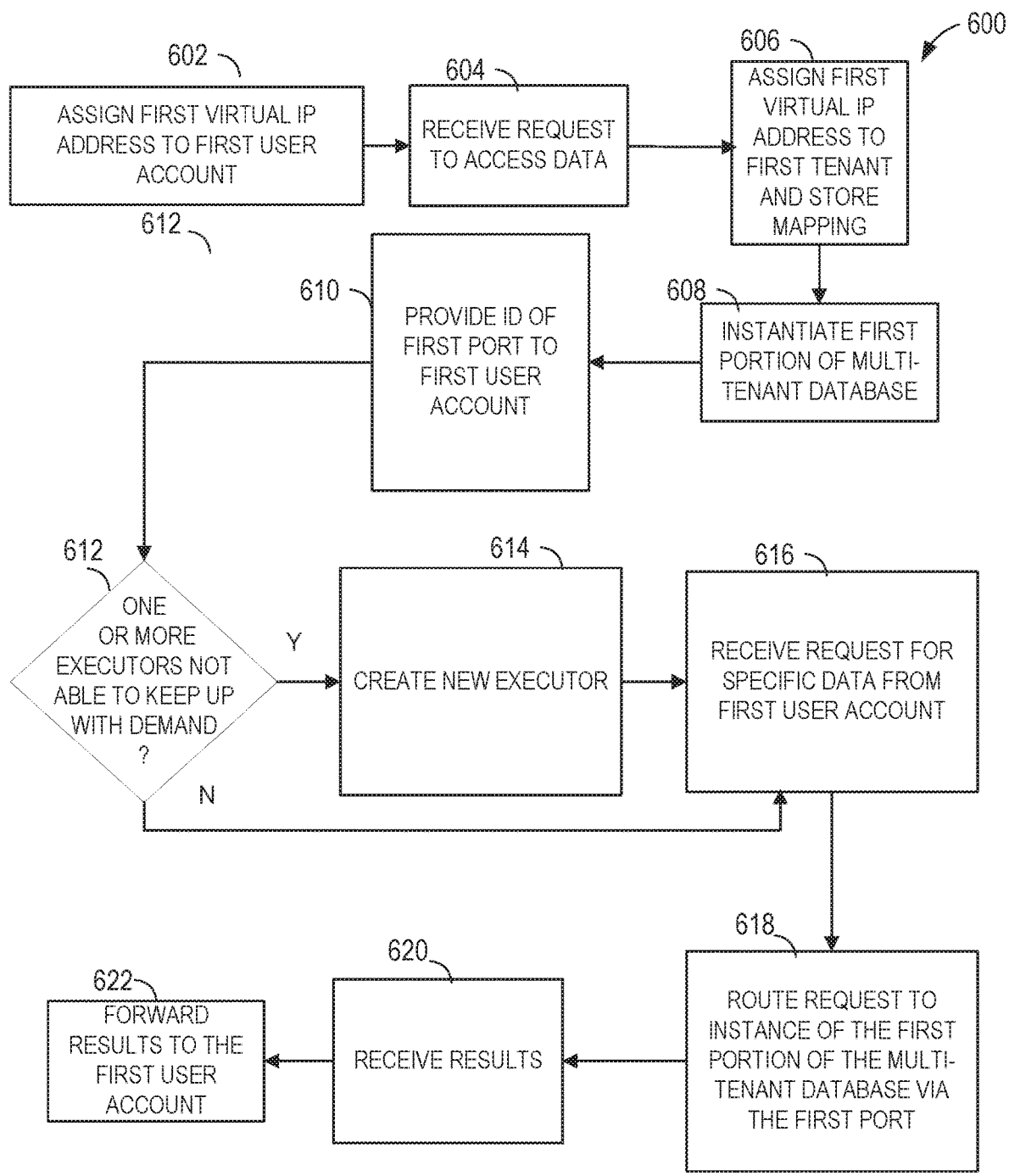
FIG. 6 is a flow diagram illustrating a method for providing elastic database provisioning, in accordance with an example embodiment.

FIG. 6 is a flow diagram illustrating a method 600 for providing elastic database provisioning, in accordance with an example embodiment. At operation 602, a first virtual Internet Protocol (IP) address is assigned to a first user account. This assigning may utilize a Docker service. At operation 604, a request is received from the first user account to access data stored for a first tenant in a multi-tenant database. In an example embodiment, the multitenant database is an in-memory database. At operation 606, the first virtual IP address is assigned to the first tenant, and a mapping is stored between the first virtual IP address and the first tenant in an IP-tenant match data structure. This may be performed using a Docker service.

At operation 608, a first portion of the multi-tenant database is instantiated, the first portion being assigned to the first tenant, without instantiating the multi-tenant database as a whole. This means that while the first portion (and potentially other portions) of the multi-tenant database is instantiated, there is at least one portion of the multi-tenant database that is not instantiated at this operation. The instantiation provides access to an instance of the first portion of the multi-tenant database via a first port. This port may be, for example, a virtual bridge. At operation 610, an identification of the first port is provided to the first user account.

At operation 612, concurrent accessing of the instance of the first portion of the multi-tenant database is monitored to determine if one or more executors assigned to the instance of the first portion of the multi-tenant database is unable to keep up with demand. If so, then at operation 614 a new executor assigned to the instance of the first portion of the multi-tenant database is created.

At operation 616, a request for specific data is received from the first user account. The request for specific data includes the first virtual IP address and the identification of the first port.

At operation 618, the request for specific data is routed to the instance of the first portion of the multi-tenant database via the first port. At operation 620, results from the instance of the first portion of the multi-tenant database are received via the first port. At operation 622, the results are forwarded to the first user account.

EXAMPLES

Example 1. A system comprising:
at least one hardware processor; and
a computer-readable medium storing instructions that, when executed by the at least one hardware processor, cause the at least one hardware processor to perform operations comprising:
  assigning a first virtual Internet Protocol (IP) address to a first user account,
  receiving a request from the first user account to access data stored for a first tenant in a multi-tenant database;
  assigning the first virtual IP address to the first tenant and storing a mapping between the first virtual IP address and the first tenant in an IP-tenant match data structure;
  instantiating a first portion of the multi-tenant database, the first portion being assigned to the first tenant, without instantiating the multi-tenant database as a whole, the instantiation providing access to an instance of the first portion of the multi-tenant database via a first port;
  providing an identification of the first port to the first user account;
  receiving a request for specific data from the first user account, the request for specific data including the first virtual IP address and the identification of the first port;
  routing the request for specific data to the instance of the first portion of the multi-tenant database via the first port;
  receiving results from the instance of the first portion of the multi-tenant database via the first port; and
  forwarding the results to the first user account.

Example 2. The system of Example 1, wherein the operations further comprise:
monitoring concurrent accessing of the instance of the first portion of the multi-tenant database to determine if one or more executors assigned to the instance of the first portion of the multi-tenant database are able to keep up with demand; and
if the one or more executors assigned to the instance of the first portion of the multi-tenant database are not able to keep up with demand, creating a new executor assigned to the instance of the first portion of the multi-tenant database.

Example 3. The system of Examples 1 or 2, wherein the multi-tenant database is an in-memory database.

Example 4. The system of any of Examples 1-3, wherein the assigning the first virtual IP address to the first tenant utilizes a Docker service.

Example 5. The system of Example 4, wherein the operations further comprise:
obtaining the first virtual IP address from the Docker service; and
concatenating the first virtual IP address with an instance number assigned to the instance of the first portion of the multi-tenant database.

Example 6. The system of any of Examples 1-5, wherein the assigning the first virtual IP address to the first tenant is performed via a secure shell (SSH) tunnel.

Example 7. The system of any of Examples 1-6, wherein the first port is a virtual bridge.

Example 8. A method comprising:
assigning a first virtual Internet Protocol (IP) address to a first user account;
receiving a request from the first user account to access data stored for a first tenant in a multi-tenant database;
assigning the first virtual IP address to the first tenant and storing a mapping between the first virtual IP address and the first tenant in an IP-tenant match data structure;
instantiating a first portion of the multi-tenant database, the first portion being assigned to the first tenant, without instantiating the multi-tenant database as a whole, the instantiation providing access to an instance of the first portion of the multi-tenant database via a first port;
providing an identification of the first port to the first user account;
receiving a request for specific data from the first user account, the request for specific data including the first virtual IP address and the identification of the first port;
routing the request for specific data to the instance of the first portion of the multi-tenant database via the first port;
receiving results from the instance of the first portion of the multi-tenant database via the first port; and
forwarding the results to the first user account.

Example 9. The method of Example 8, wherein the operations further comprise:
monitoring concurrent accessing of the instance of the first portion of the multi-tenant database to determine if one or more executors assigned to the instance of the first portion of the multi-tenant database are able to keep up with demand; and
if the one or more executors assigned to the instance of the first portion of the multi-tenant database are not able to keep up with demand, creating a new executor assigned to the instance of the first portion of the multi-tenant database.

Example 10. The method of Examples 8 or 9, wherein the multi-tenant database is an in-memory database.

Example 11. The method of any of Examples 8-10, wherein the assigning the first virtual IP address to the first tenant utilizes a Docker service.

Example 12. The method of Example 11, wherein the operations further comprise:

obtaining the first virtual IP address from the Docker service; and concatenating the first virtual IP address with an instance number assigned to the instance of the first portion of the multi-tenant database.

Example 13. The method of any of Examples 8-12, wherein the assigning the first virtual IP address to the first tenant is performed via a secure shell (SSH) tunnel.

Example 14. The method of any of Examples 8-13, wherein the first port is a virtual bridge.

Example 15. A non-transitory machine-readable medium storing instructions which, when executed by one or more processors, cause the one or more processors to perform operations comprising:

assigning a first virtual Internet Protocol (IP) address to a first user account;

receiving a request from the first user account to access data stored for a first tenant in a multi-tenant database;

assigning the first virtual IP address to the first tenant and storing a mapping between the first virtual IP address and the first tenant in an IP-tenant match data structure;

instantiating a first portion of the multi-tenant database, the first portion being assigned to the first tenant, without instantiating the multi-tenant database as a whole, the instantiation providing access to an instance of the first portion of the multi-tenant database via a first port;

providing an identification of the first port to the first user account;

receiving a request for specific data from the first user account, the request for specific data including the first virtual IP address and the identification of the first port;

routing the request for specific data to the instance of the first portion of the multi-tenant database via the first port;

receiving results from the instance of the first portion of the multi-tenant database via the first port; and forwarding the results to the first user account.

Example 16. The non-transitory machine-readable medium of Example 15, wherein the operations further comprise:

monitoring concurrent accessing of the instance of the first portion of the multi-tenant database to determine if one or more executors assigned to the instance of the first portion of the multi-tenant database are able to keep up with demand; and if the one or more executors assigned to the instance of the first portion of the multi-tenant database are not able to keep up with demand, creating a new executor assigned to the instance of the first portion of the multi-tenant database.

Example 17. The non-transitory machine-readable medium of Examples 15 or 16, wherein the multi-tenant database is an in-memory database.

Example 18. The non-transitory machine-readable medium of any of Examples 15-17, wherein the assigning the first virtual IP address to the first tenant utilizes a Docker service.

Example 19. The non-transitory machine-readable medium of Example 18, wherein the operations further comprise:

obtaining the first virtual IP address from the Docker service; and concatenating the first virtual IP address with an instance number assigned to the instance of the first portion of the multi-tenant database.

Example 20. The non-transitory machine-readable medium of any of Examples 15-19, wherein the assigning the first virtual IP address to the first tenant is performed via a secure shell (SSH) tunnel.

Figure 7:
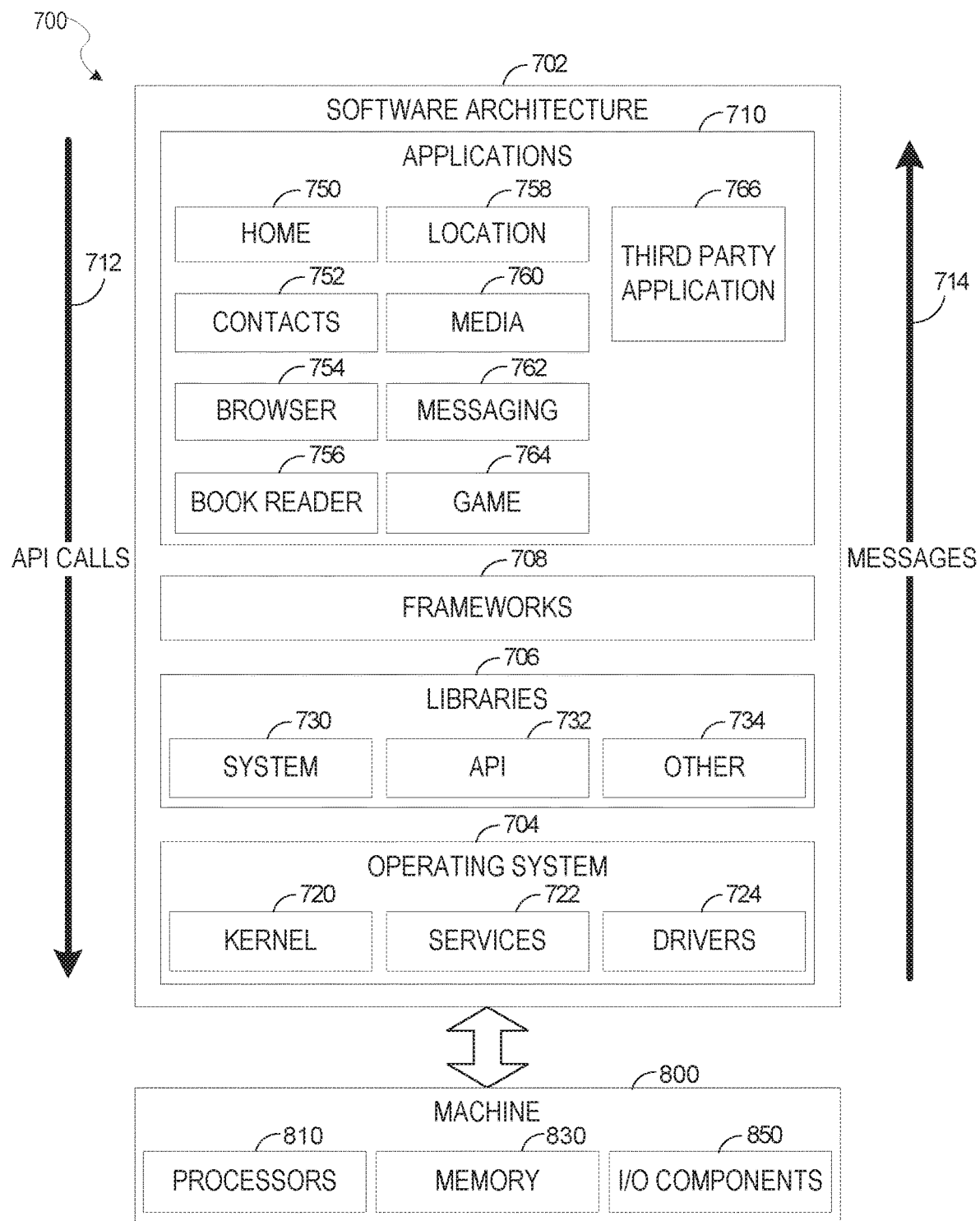
FIG. 7 is a block diagram illustrating an architecture of software, which can be installed on any one or more of the devices described above.

FIG. 7 is a block diagram 700 illustrating an architecture of software 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processors 810, memory 830, and input/output (I/O) components 850. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
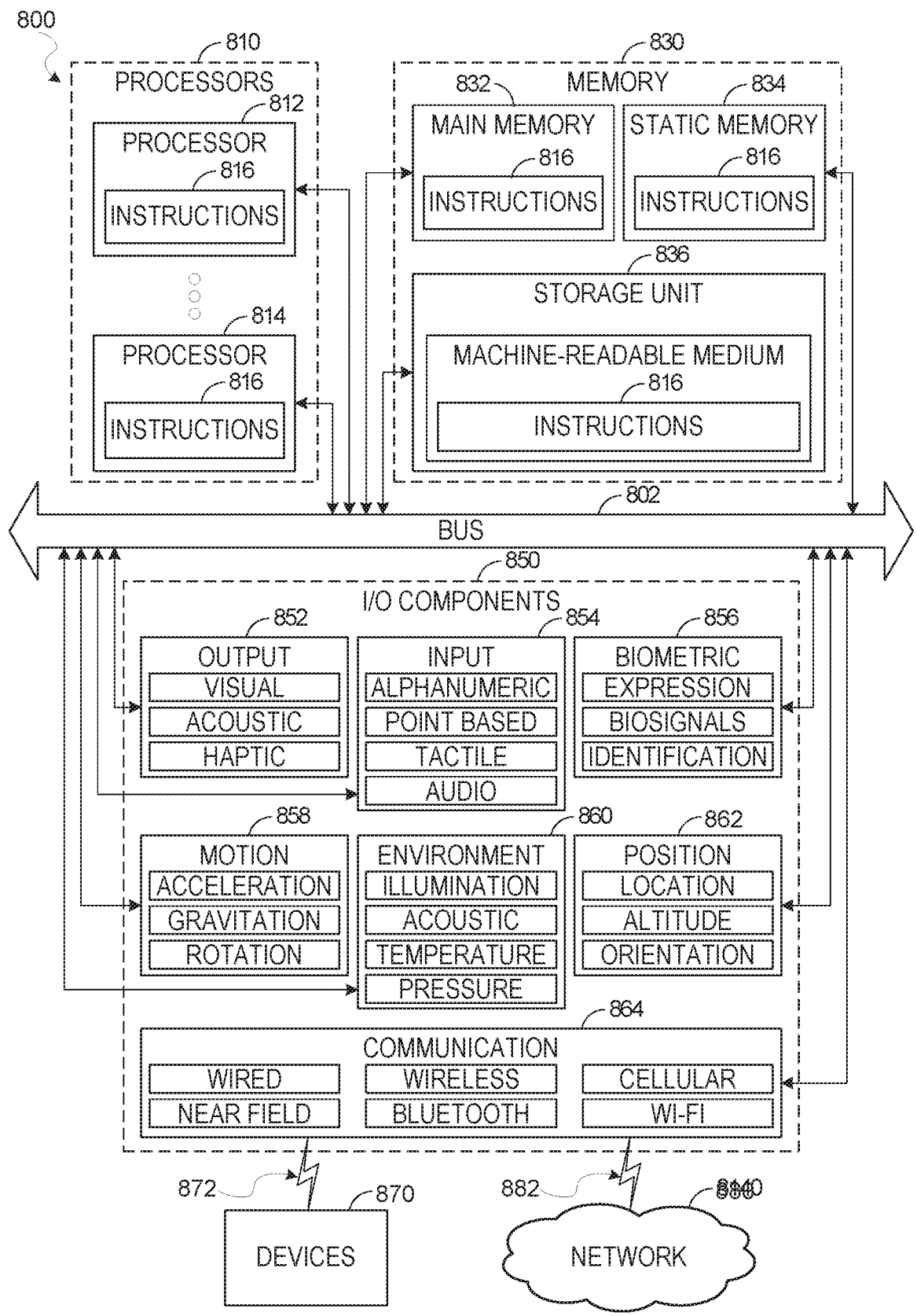
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an apples, an app, or other executable code) for causing the machine 800 to perform any one or more of the methodologies discussed herein may be executed. For example, the instructions 816 may cause the machine 800 to execute the method 600 of FIG. 6. Additionally, or alternatively, the instructions 816 may implement FIGS. 1-5 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by machine 800.

The I/O components 850 may include a wide variety of components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to processors 810. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide interoperability for Microwave Access (WiMAX), Long-Term Evolution (LTE) standard, others defined by various standard-setting organizations, other long-range protocols, or other data transfer technology.

The instructions 816 may be transmitted or received over the network 8140 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   assigning a first virtual Internet Protocol (IP) address to a first user account;
   receiving a first request from the first user account to access data stored for a first tenant in a multi-tenant database;
   assigning the first virtual IP address to the first tenant and storing a mapping between the first virtual IP address and the first tenant in an IP-tenant match data structure;
   booting an instance of a first portion of the multi-tenant database, the first portion being assigned to the first tenant and storing the data for the first tenant, without booting an instance of the multi-tenant database as a whole, the booting providing availability access to the instance of the first portion of the multi-tenant database via a first port;
   providing an identification of the first port to the first user account;
   receiving a second request for specific data from the first user account, the second request for the specific data including the first virtual IP address and the identification of the first port;
   routing the second request for the specific data to the instance of the first portion of the multi-tenant database via the first port;
   receiving results from the instance of the first portion of the multi-tenant database via the first port; and
   forwarding the results to the first user account.

2. The system of claim 1, wherein the operations further comprise:
   monitoring concurrent accessing of the instance of the first portion of the multi-tenant database to determine that one or more executors assigned to the instance of the first portion of the multi-tenant database are able to keep up with demand; and
   when the one or more executors assigned to the instance of the first portion of the multi-tenant database are unable to keep up with the demand, creating a new executor assigned to the instance of the first portion of the multi-tenant database.

3. The system of claim 1, wherein the multi-tenant database is an in-memory database.

4. The system of claim 1, wherein the assigning the first virtual IP address to the first tenant utilizes a Docker service.

5. The system of claim 4, wherein the operations further comprise:
   obtaining the first virtual IP address from the Docker service; and
   concatenating the first virtual IP address with an instance number assigned to the instance of the first portion of the multi-tenant database.

6. The system of claim 1, wherein the assigning the first virtual IP address to the first tenant is performed via a secure shell (SSH) tunnel.

7. The system of claim 1, wherein the first port is a virtual bridge.

8. A method comprising:
   assigning a first virtual Internet Protocol (IP) address to a first user account;
   receiving a first request from the first user account to access data stored for a first tenant in a multi-tenant database;
   assigning the first virtual IP address to the first tenant and storing a mapping between the first virtual IP address and the first tenant in an IP-tenant match data structure;
   booting an instance of a first portion of the multi-tenant database, the first portion being assigned to the first tenant and storing the data for the first tenant, without booting an instance of the multi-tenant database as a whole, the booting providing availability access to the instance of the first portion of the multi-tenant database via a first port;
   providing an identification of the first port to the first user account;
   receiving a second request for specific data from the first user account, the second request for the specific data including the first virtual IP address and the identification of the first port;
   routing the second request for the specific data to the instance of the first portion of the multi-tenant database via the first port;
   receiving results from the instance of the first portion of the multi-tenant database via the first port; and
   forwarding the results to the first user account.

9. The method of claim 8, further comprising:
   monitoring concurrent accessing of the instance of the first portion of the multi-tenant database to determine that one or more executors assigned to the instance of the first portion of the multi-tenant database are able to keep up with demand; and
   when the one or more executors assigned to the instance of the first portion of the multi-tenant database are unable to keep up with the demand, creating a new executor assigned to the instance of the first portion of the multi-tenant database.

10. The method of claim 8, wherein the multi-tenant database is an in-memory database.

11. The method of claim 8, wherein the assigning the first virtual IP address to the first tenant utilizes a Docker service.

12. The method of claim 11, further comprising:
   obtaining the first virtual IP address from the Docker service; and concatenating the first virtual IP address with an instance number assigned to the instance of the first portion of the multi-tenant database.

13. The method of claim 8, wherein the assigning the first virtual IP address to the first tenant is performed via a secure shell (SSH) tunnel.

14. The method of claim 8, wherein the first port is a virtual bridge.

15. A non-transitory machine-readable medium storing instructions which, when executed by one or more processors, cause the one or more processors to perform operations comprising:
- assigning a first virtual Internet Protocol (IP) address to a first user account;
- receiving a first request from the first user account to access data stored for a first tenant in a multi-tenant database;
- assigning the first virtual IP address to the first tenant and storing a mapping between the first virtual IP address and the first tenant in an IP-tenant match data structure;
- booting an instance of a first portion of the multi-tenant database, the first portion being assigned to the first tenant and storing the data for the first tenant, without booting an instance of the multi-tenant database as a whole, the booting providing availability access to the instance of the first portion of the multi-tenant database via a first port;
- providing an identification of the first port to the first user account;
- receiving a second request for specific data from the first user account, the second request for the specific data including the first virtual IP address and the identification of the first port;
- routing the second request for the specific data to the instance of the first portion of the multi-tenant database via the first port;
- receiving results from the instance of the first portion of the multi-tenant database via the first port; and
- forwarding the results to the first user account.

16. The non-transitory machine-readable medium of claim 15, wherein the operations further comprise:
- monitoring concurrent accessing of the instance of the first portion of the multi-tenant database to determine that one or more executors assigned to the instance of the first portion of the multi-tenant database are able to keep up with demand; and
- when the one or more executors assigned to the instance of the first portion of the multi-tenant database are unable to keep up with the demand, creating a new executor assigned to the instance of the first portion of the multi-tenant database.

17. The non-transitory machine-readable medium of claim 15, wherein the multi-tenant database is an in-memory database.

18. The non-transitory machine-readable medium of claim 15, wherein the assigning the first virtual IP address to the first tenant utilizes a Docker service.

19. The non-transitory machine-readable medium of claim 18, wherein the operations further comprise:
- obtaining the first virtual IP address from the Docker service; and
- concatenating the first virtual IP address with an instance number assigned to the instance of the first portion of the multi-tenant database.

20. The non-transitory machine-readable medium of claim 15, wherein the assigning the first virtual IP address to the first tenant is performed via a secure shell (SSH) tunnel.

* * * * *